United States Patent [19]

Hernandez

[11] Patent Number: 4,638,963

[45] Date of Patent: Jan. 27, 1987

[54] ELECTRICAL WALL BRACKET

[76] Inventor: Jose L. Hernandez, 9940 La Tuna Canyon Rd., Sun Valley, Calif. 91352

[21] Appl. No.: 735,449

[22] Filed: May 17, 1985

[51] Int. Cl.⁴ .................................................. F16L 5/00
[52] U.S. Cl. ....................................... 248/56; 248/27.1
[58] Field of Search .................. 248/56, 27.1, 27.3, 248/DIG. 6; 285/61; 174/53, 58, 63, 52 R

[56] References Cited

U.S. PATENT DOCUMENTS

| | | | |
|---|---|---|---|
| 2,042,620 | 6/1936 | Noyes | 248/DIG. 6 X |
| 3,273,836 | 9/1966 | Hallerberg | 248/27.1 |
| 3,966,152 | 6/1976 | Bromberg | 248/27.1 |
| 4,304,957 | 12/1981 | Slater | 248/27.1 X |
| 4,328,903 | 5/1982 | Baars | 248/27.1 X |
| 4,517,408 | 5/1985 | Pegram | 248/56 X |

FOREIGN PATENT DOCUMENTS 152065 10/1955 Sweden ................................. 248/56

Primary Examiner—J. Franklin Foss
Attorney, Agent, or Firm—Allan M. Shapiro

[57] ABSTRACT

The main structural part of the electrical wall bracket is a frame which inserts into an opening in dry wall. Flanges on the frame engage the outside of the dry wall. V-shaped attachment jaws engage behind the dry wall, and the frame is secured by machine screws engaging the frame and attachment jaws. A cable clamp is mounted on the frame interiorly of the opening to retain a cable adjacent the opening.

18 Claims, 3 Drawing Figures

U.S. Patent  Jan. 27, 1987  4,638,963
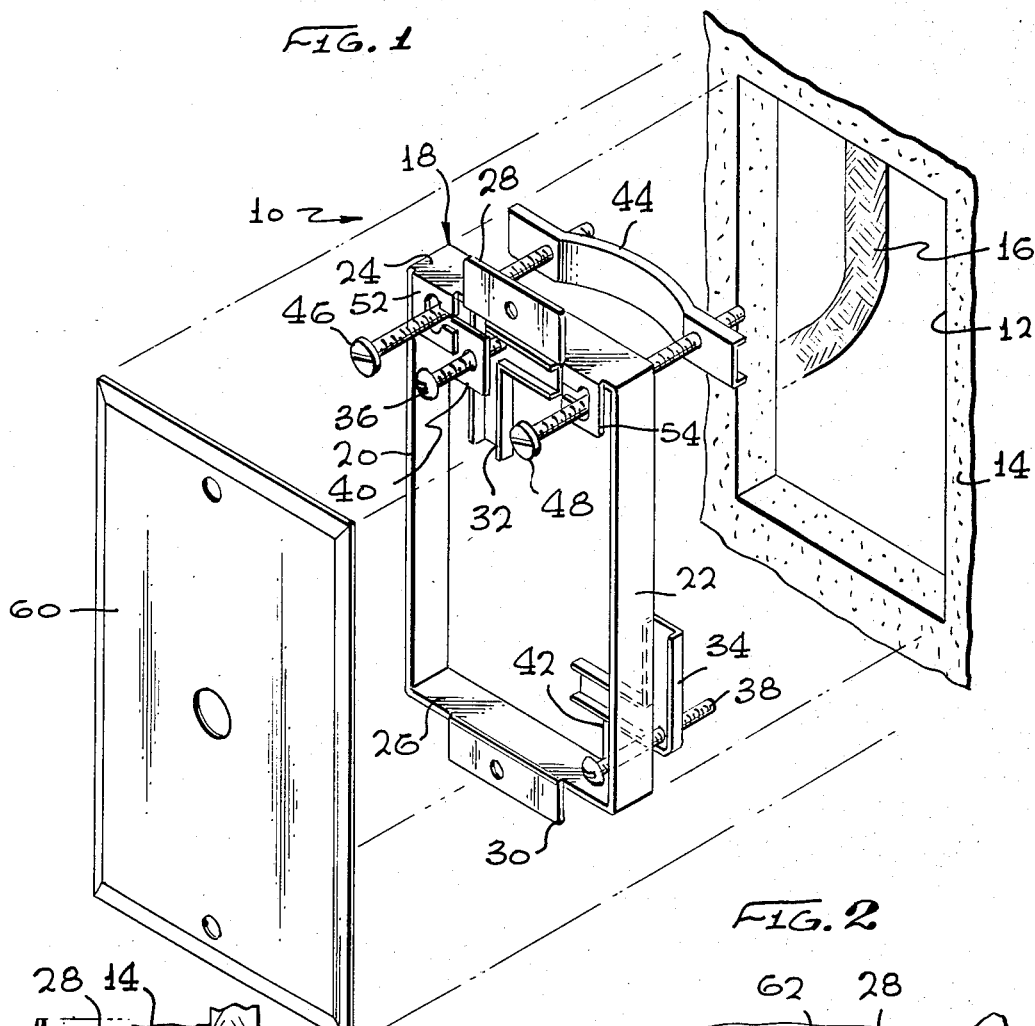
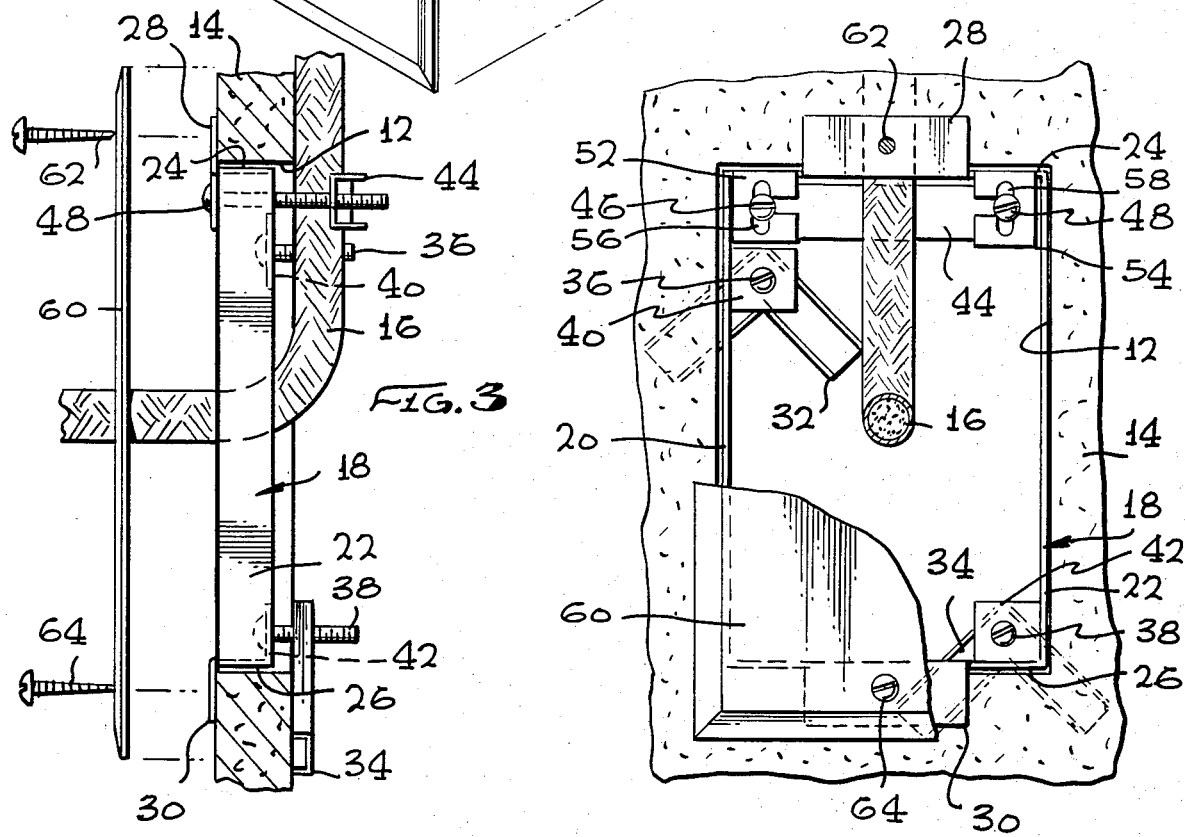

4,638,963

ELECTRICAL WALL BRACKET

BACKGROUND OF THE INVENTION

This invention is directed to an electrical wall bracket which is particularly suited for securement of telephone cable and the like in hollow walls, with respect to an opening in the dry wall.

In the building of homes, and more particularly in the installation of interior walls and office buildings, the studs are set and the interior communication cables are strung in the stud spaces. The cable may be secured to the studs in particular locations, and its ends are noted. After the installation of dry wall, holes are punched so that the cable is presumably accessible. This is different than the installation of electric receptacles because the receptacles are secured to the studs and the wires are connected thereto before the installation of dry wall. With the installation of the dry wall, in the case of electric receptacles, holes are punched in the dry wall to match the already installed receptacle boxes. In the case of low voltage, telephone and other communication cable, receptacle boxes are not used. Instead, the cable is presumably behind the punched opening in the wall. The electrician or telephone installer must fish through the opening into the wall cavity to find the cable. Sometimes the cable has been dislocated from its position so that it is difficult to find, or is even no longer accessible. Accordingly, there is need for an electrical wall bracket which conveniently secures the cable with respect to the opening.

SUMMARY OF THE INVENTION

In order to aid in the understanding of this invention, it can be stated in essentially summary form that it is directed to an electrical wall bracket which includes a frame which is securable into an opening in dry wall and which carries a cable clamp positioned interiorly of the wall space so that a cable can be secured with respect to an opening in the dry wall.

It is, thus, an object and advantage of this invention to provide an electrical wall bracket which secures an electrical cable behind an opening in dry wall so that the cable is easily accessible when connection thereto is required.

It is another object and advantage of this invention to provide an electrical wall bracket which includes a frame having flanges which engage on the exterior of dry wall board at an opening therein and which has v-shaped attachment jaws which engage interiorly of the dry wall board to retain the frame in place with respect to the opening.

It is another object and advantage of this invention to provide an electrical wall bracket which is inexpensive and convenient to handle so that dry wall installers can make an opening at the desired location in the dry wall at the time of installation of the dry wall and secure an electric cable in the wall space onto the bracket so that after installation of the dry wall, the electric cable is accessible through the dry wall opening.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is an exploded isometric view of the electrical wall bracket of this invention associated with an opening in a dry wall board, with a cable behind the opening, and also showing a cover plate for the electrical wall bracket.

FIG. 2 is an enlarged front view of the wall bracket secured within the opening, with parts broken away.

FIG. 3 is a side-elevational view of the wall bracket within the opening, with the wall board shown in section and the cover plate shown in exploded position.

DESCRIPTION OF THE PREFERRED EMBODIMENT

The wall bracket 10 of this invention is shown in association with a rectangular opening 12 in a wall made of dry wall board 14. Electrical cable 16 extends into the space behind the wall board. It is intended that the cable 16 will be pulled through the opening 12 to a position in front of the wall for connection to electrical equipment. Wall bracket 10 is secured with respect to the opening 12 and clamps cable 16 to the wall bracket to retain the wall bracket with respect to the opening.

The principal structural element of the wall bracket 10 is rectangular frame 18. Rectangular frame 18 has left and right side walls 20 and 22, as well as top and bottom side walls 24 and 26. The side walls are preferably integrally formed of a single piece of stamped metal. Formed therewith are top and bottom flanges 28 and 30. The side walls are sized to fit within the opening 12, and the top and bottom flanges are sized to engage on the front of the wall board 14 above and below the opening 12. The depth of rectangular frame in the direction of wall thickness is preferably less than wall thickness, as is indicated in FIG. 3. Flanges 28 and 30 position frame 18 so that the front edge of the frame is substantially even with the front of the wall board 14 when the flanges are in engagement with the front of the wall board.

Frame 18 is retained in place within opening 12 by means of attachment jaws 32 and 34. Attachment jaws 32 and 34 are V-shaped, formed of channel-shaped or otherwise substantially flat material configured into a V-shape. A tapped hole is formed through each of the attachment jaws near the apex of the V, and machine screws 36 and 38 are threaded into the holes on the attachment jaws. Bosses 40 and 42 are secured to the left and right side walls 20 and 22, respectively, and are in-turned with respect to the side walls to face into the open area defined interiorly of the side walls. Each of these bosses has a clearance hole therein, with the screws 36 and 38 respectively passing through the clearance holes with the heads toward the front, the flange side of the frame. When free, the attachment jaws 32 and 34 normally hang down from their respective screws, as shown in FIG. 2. When the screws 36 and 38 are secured, the attachment jaws engage behind the wall board to clamp the frame in place, as shown in FIG. 3. If the attachment jaws tend to rotate when the screws are turned, they can be readily reached through the interior of the frame. However, during the installation of the frame into the opening in the wall board, with the screws 36 and 38 loose, the frame can be readily installed by rotating the attachment jaws so that they lie interiorly of the outline of frame 18, as shown in FIG. 1. With the attachment jaws in that position, the wall bracket can be quickly inserted into the opening in the wall. When the attachment jaws are released, they gravitationally swing downward to the position of FIG. 3, and in that position, the machine screws can be tightened to clamp the flanges against the front of the wall board and the attachment jaws against the back of the wall board. Thus, the wall bracket 10 can be quickly and securely clamped in place.

With the rectangular frame clamped in place with respect to the opening in the dry wall, it only becomes necessary to secure cable 16 with respect to the frame to have the cable 16 secured with respect to the opening. To accomplish this, the cable is clamped with respect to the frame by means of clamping the cable between the top side wall 24 and clamp 44 so these two elements act as jaws for engaging upon the cable. Clamp 44 is formed of channel-shaped metal which may be straight or which may have a slight curve thereon as indicated. The advantage of the curve is that it helps retain cable 16 with respect to the center plate of top wall 24 so that the cable is better centered with respect to the opening interiorly of the frame. Clamp 44 is secured to the frame by means of machine screws 46 and 48 which are threadedly engaged in clamp 44. Bosses 52 and 54 are in-turned tabs attached to top wall 24 outboard of top flange 28. These bosses have openings therein through which the machine screws 46 and 48 respectively pass. The heads of the machine screws engage on the top of the bosses. It is convenient for the bosses to have T-shaped openings 56 and 58, see FIG. 2. The slots of these T-shaped openings are large enough to pass the shanks of the machine screws 46 and 48, respectively, and small enough so that the heads engage thereon. With this arrangement, one or both of the machine screws may be slipped out of its boss so that the clamp 44 can be engaged behind cable 16. Thereupon, the machine screw can be reinstalled in its opening and both of the machine screws are tightened to clamp the cable in place, as is seen in FIG. 3.

Opening 12 is a rough opening, and wall bracket 10 is a piece of hardware which is secured in place but is not designed for finished appearance. In order to provide an attractive cover and adequate closure, cover plate 60 is provided. Cover plate 60 is a conventional cover plate and may have a central opening through which the cable 16 can extend. Cover 60 is detachably retained in place by means of machine screws 62 and 64 which engage through appropriate holes in the cover plate and engage in threaded holes in flanges 28 and 30, respectively. In this way, cable 16 is retained in place so that it may be reached by the telephone installer or other workman for completion of the connection to the cable.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An electrical wall bracket comprising:
  a substantially rectangular frame having an open interior and having at least one boss directed toward the interior thereof, said boss having an opening therein;
  means on said frame for securing said frame at least partially within an opening in wall board; and
  a cable clamp mounted on said frame, said cable clamp comprising a clamp for engagement with the cable and at least one machine screw engaged through said opening in said boss and engaging said clamp so as to adjustably secure said clamp with respect to said frame for securing the cable with respect to the opening in the wall board so that the cable can be located and drawn through the opening in the wall board.

2. The electrical wall bracket of claim 1 wherein there are two of said machine screws and said frame has a substantially open interior and there are two bosses secured on said frame and directed toward said interior of said frame, said bosses each having an opening therein for respective receipt of one of said screws.

3. The electrical wall bracket of claim 2 wherein said opening in at least one of said bosses is slotted so that said screw passing through said slotted opening in said boss can be disengaged from said boss without being disengaged from said clamp.

4. An electrical wall bracket comprising:
  a rectangular frame for positioning at least partially within an opening in wall board, said frame having at least one outwardly directed flange for engagement on the exterior of the wall board, said flange being positioned with respect to said frame so that at least a portion of said frame extends into the opening in the wall board when said flange is in engagement with the exterior of the wall board;
  means on said frame for securing said frame at least partially within the opening in the wall board; and
  a cable clamp mounted on said frame for clamping on a cable positioned behind the wall board for securing the cable with respect to the opening in the wall board so that the cable can be located and drawn through the opening in the wall board.

5. The electrical wall bracket of claim 2 wherein said frame is a rectangular frame having at least one outwardly directed flange for engagement on the exterior of the wall board, said flange being positioned with respect to said frame so that at least a portion of said frame extends into the opening in the wall board when said flange is in engagement with the exterior of the wall board.

6. The electrical wall bracket of claim 5 wherein said means for securing is an attachment jaw adjustably mounted on said frame so that said attachment jaw can engage behind the wall board to clamp said frame with respect to the wall board.

7. The electrical wall bracket of claim 4 wherein there is an attachment jaw adjustably mounted on said frame so that said attachment jaw can engage behind the wall board to clamp said frame with respect to the wall board.

8. The electrical wall bracket of claim 7 wherein said attachment jaw is a V-shaped attachment jaw and there is a screw engaging both said frame and said attachment jaw for tightening said attachment jaw with respect to said frame to clamp said frame with respect to the wall board.

9. The electrical wall bracket of claim 8 wherein there are two said attachment jaw and each is a V-shaped attachment jaw, each of said attachment jaws having a threaded opening therein, a pair of screws respectively engaging said threaded openings, said screws also engaging said frame so that tightening of said screws causes clamping of said frame with respect to the wall board.

10. An electrical wall bracket comprising:
  a rectangular frame for positioning within an opening in wall board, said rectangular frame having a substantially open interior, first and second attachment bosses attached to said frame and directed toward the interior of said frame, each of said bosses having an opening therein, first and second clamp bosses on said frame, openings in said first and second clamp bosses, at least one flange extending from said frame for engaging on the exterior of the wall board when said frame is positioned at least partially within the opening in the wall board;

attachment means for attaching said frame with respect to the wall board, said attachment means comprising two V-shaped nuts, each serving as an attachment jaw, a screw engaged in each said v-shaped nut, each said screw also being engaged through an opening in one of said attachment bosses so that the heads on said attachment screws overlie said openings in said attachment bosses so that tightening of said attachment screws causing drawing of said attachment jaws toward said frame to clamp said electrical wall bracket with respect to the wall board; and a cable clamp connected to said frame, said cable clamp comprising a clamp bar and first and second clamp screws threadedly engaged in said clamp bar, said clamp screws engaging through said openings in said clamp bosses so that said clamp bar can be drawn toward said frame for clamping a cable therebetween.

11. The electrical wall bracket of claim 10 wherein said screws engaging said clamp bar are clamp screws and at least one of said openings in said bosses through which said clamp screws extend is a slotted opening so that said clamp screw can be removed from said boss without removing said clamp screw from said clamp.

12. The electrical wall bracket of claim 11 wherein both said clamp screws are engaged in slotted holes in said bosses.

13. An electrical wall bracket comprising:
a substantially rectangular frame having an open interior, a boss secured to said frame and directed toward the interior thereof, said boss defining a slot;
means on said frame for securing said frame at least partially within an opening in wall board; and
a cable clamp mounted on said frame for clamping on a cable positioned behind the wall board for securing the cable with respect to the opening in the wall board so that the cable be located and drawn through the opening in the wall board, said cable clamp comprising a clamp for engagement with a cable, and at least one screw engaged in said slot defined by said boss, said screw engaging said cable clamp so as to adjustably secure said clamp with respect to said frame for clamping on the cable.

14. The electrical wall bracket of claim 13 wherein said frame is a rectangular frame having at least one outwardly directed flange for engagement on the exterior of the wall board, said flange being positioned with respect to said frame so that at least a portion of said frame extends into the opening in the wall board when said flange is in engagement with the exterior of the wall board.

15. The electrical wall bracket of claim 14 wherein said means for securing is an attachment jaw adjustably mounted on said frame so that said attachment jaw can engage behind the wall board to clamp said frame with respect to the wall board.

16. The electrical wall bracket of claim 15 wherein said attachment jaw is a V-shaped attachment jaw and there is a screw engaging both said frame and said attachment jaw for tightening said attachment jaw with respect to said frame to clamp said frame with respect to the wall board.

17. The electrical wall bracket of claim 16 wherein there are two said attachment jaws and each is a V-shaped attachment jaw, each of said attachment jaws having a threaded opening therein, a pair of screws respectively engaging said threaded openings, said screws also engaging said frame so that tightening of said screws causes clamping of said frame with respect to the wall board.

18. An electrical wall bracket comprising:
a rectangular frame for positioning within an opening in wall board, said frame being a rectangular frame having a substantially open interior, first and second attachment bosses attached to said frame and directed toward the interior of said frame, at least one flange extending from said frame for engaging on the exterior of the wall board when said frame is positioned at least partly within the opening in the wall board;
first and second V-shaped nuts each having a threaded opening adjacent the apex thereof, first and second screws respectively engaged in said threaded openings, said screws also being engaged with respect to said attachment bosses so that when a portion of one of said V-shaped nuts is engaged as an attachment jaw behind the wall board, tightening of its screw causes securement of said frame with respect to the opening in the wall board; and
a cable clamp connected to said frame, said cable clamp being for engagement with a cable to clamp the cable with respect to the wall bracket and with respect to the opening in the wall board, first and second clamp bosses mounted on said frame and directed toward the open interior thereof to define a slot, a clamp bar, first and second clamp screws respectively engaged in said slots defined by said first and second bosses and threadedly engaged in said clamp bar so that said clamp bar can be drawn toward said frame for clamping a cable therebetween.

* * * * *